Oct. 3, 1933.        L. A. KOCH, JR        1,928,978
ELECTRIC SYSTEM FOR MOTOR VEHICLES
Original Filed Dec. 29, 1931    2 Sheets-Sheet 1

Inventor:
Louis A. Koch Jr.
by Henry O. Bright
Atty.

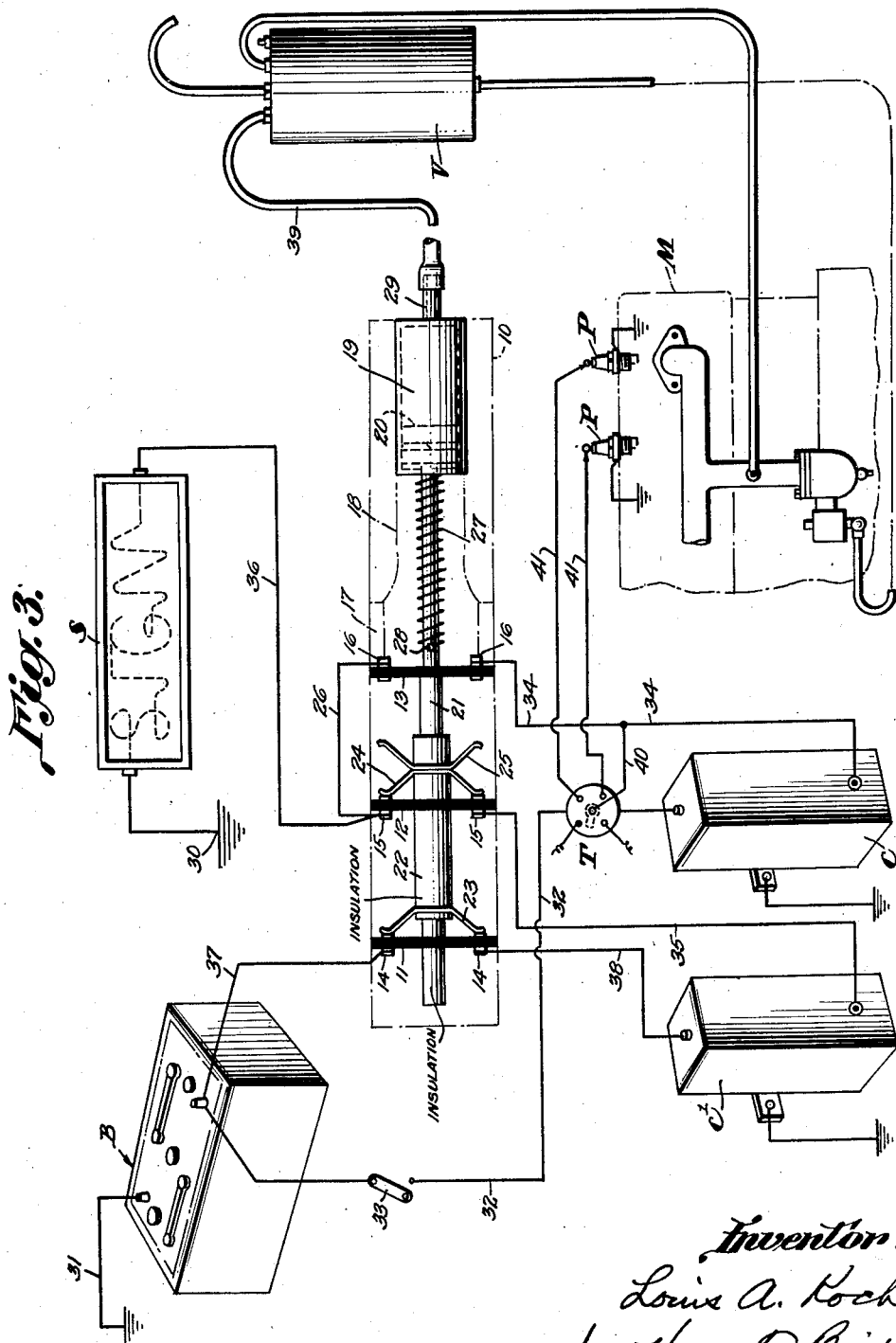

Patented Oct. 3, 1933

1,928,978

UNITED STATES PATENT OFFICE 1,928,978

ELECTRIC SYSTEM FOR MOTOR VEHICLES

Louis A. Koch, Jr., Louisville, Ky.

Original application December 29, 1931, Serial No. 583,765. Divided and this application June 21, 1932. Serial No. 618,571

3 Claims. (Cl. 171—97)

My invention relates to electric systems for motor vehicles and the present application constitutes a division of my prior application 583,765.

In my prior Patent 1,854,654 I show and describe a "neon" sign in association with a motor vehicle and connected with the high tension terminal of the vibratory running coil of the vehicle. In the embodiment of my prior application the sign will be extinguished when the motor is idle and the switch of the motor ignition system operated to "off" position. My present invention contemplates the use of a second vibratory coil and the introduction of my automatic switch into the electric system of the vehicle so that the operation of said switch will connect the sign with the running vibratory coil and simultaneously disconnect the sign from a second vibratory coil when the motor is running, and on the other hand, when the motor is idle, the switch will operate to simultaneously disconnect the sign from the running coil and connect the same with the second coil, which latter coil is located without the ignition system of the vehicle.

While I have described and illustrated my invention as utilized to maintain an electric sign carried by the vehicle illuminated during both the running and idle status of the vehicle motor I wish it to be understood that the same can be readily employed to maintain the activity of other electrially operated devices which may be advantageously associated with a motor vehicle.

Figure 1:
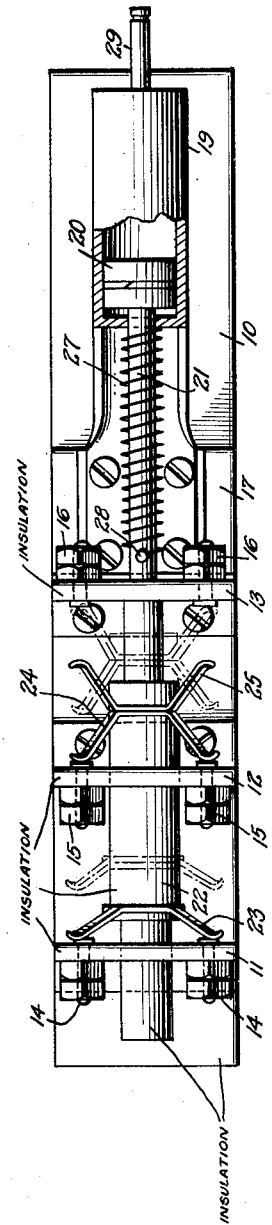
Figure 2:
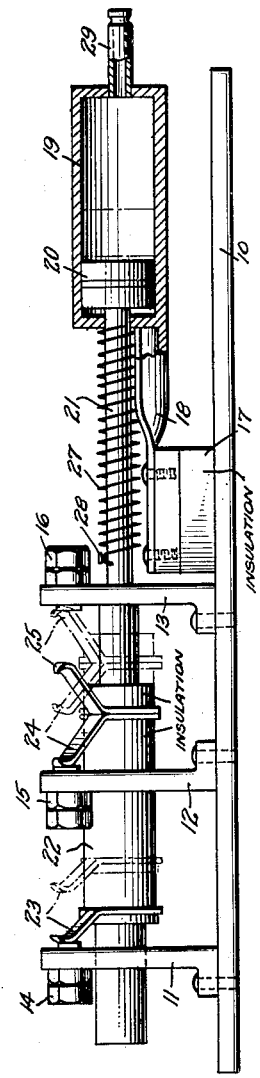

In the drawings chosen to illustrate my invention, the scope whereof is set forth in the appended claims, Figure 1 is a plan view partly in section showing my improved switch, one status of the switch being disclosed in full lines and another status in dotted lines;

Figure 2, a side view of the switch partly in section and also showing one status of the switch in full lines and another status in dotted lines, and Figure 3, a partly diagrammatic view showing the utility of my switch when associated with the electric system of a motor vehicle for maintaining the continuous illumination of a "neon" sign carried by the vehicle.

Referring to Figures 1 and 2 my improved switch is shown as comprising a base 10 on which are mounted spaced insulating members 11, 12 and 13 carrying respectively pairs of terminals 14—14; 15—15, and 16—16. Mounted on the base 10 is a block 17 to which is secured a bracket 18 extending longitudinally of the base and terminating at its free end in a cylinder 19. Operating in the cylinder 19 is a piston 20 having a piston rod 21 which is slidable in the inner end of the cylinder and in each of the members 11, 12 and 13. The rod 21 is enlarged at 22 and such enlarged portion reciprocates in the member 12. Mounted on the rod 21 between the members 11 and 12 and against one end of the enlarged portion 22 of the piston rod is a bridging contact 23 complemental to the terminals 14 and adapted to connect said terminals in one status of the switch as shown in Figure 1. Also mounted on the rod 21 between the members 12 and 13 and against the other end of the enlarged portion 22 are bridging contacts 24 and 25 complemental respectively to the terminals 15 and 16. In the normal position of the switch parts the contact 24 connects the terminals 15, while the contact 25 is disposed out of contact with the terminals 16. One of the terminals 15 is connected to one of the terminals 16 by a conductor 26 as shown and for a purpose that will presently appear. The parts of the switch are normally held in the position shown in full lines in Figures 1 and 2 by a spring 27 surrounding the piston rod and reacting from the cylinder 19 against an abutment 28 fixed to the rod. In the outer end of the cylinder and in communication with the interior of the latter, I mount a tubular nipple 29 whereby the interior of the cylinder may be connected to a source of vacuum, it being apparent that if a vacuum is created in cylinder 19 the parts of the switch will be positioned as shown in dotted lines in Figures 1 and 2 and maintained in such position against the influence of the spring 27 so long as the vacuum exists.

The utility of my invention will be understood by reference to Figure 3 wherein S is a "neon" sign, B, the battery of the electric system of a motor vehicle, V the vacuum feed tank of the vehicle, C, the running vibratory coil of the vehicle ignition circuit and C' a second or supplemental vibratory coil for illuminating connection with the sign S when the motor is idle and no vacuum exists in the tank V. The electrical connection between the coils C and C' and the sign S and the electrical connection between the battery B and the coil C' is shown controlled by my improved switch heretofore described. The sign S and the battery B are shown grounded at 30 and 31 respectively, while the coil C is connected to the battery B by a conductor 32 in which is interposed a switch 33 whereby the electrical connection between the battery and coil C may be made and broken at will according to whether it is desired to operate the associated vehicle or not. The high tension terminal of the coil C is connected to a terminal 16 by conductor 34, while the corresponding terminal of the coil C' is connected to a terminal 15 by conductor 35. The other terminal 15 is connected to the sign S by conductor 36. Battery connection with the coil C' is established in the normal status of the switch heretofore described, through conductor 37, one terminal 14, contact 23, the other terminal 14, and conductor 38. Communication between the interior of the cylinder 19 and vacuum tank V is established by a tubular member 39 leading from the tank and engaged on the nipple 29. Figure 3 shows the switch of my invention in normal status or the status existing when the motor of the vehicle is idle. At such time current from the battery passes through conductor 37, one terminal 14, contact 23, the other terminal 14 and conductor 38 to coil C'. The high tension current from the coil C' then passes through conductor 35, one terminal 15, contact 24, the other terminal 15, conductor 36, sign S, to ground 30. A timer T intermittently makes and breaks the primary circuit of the coil C and controls the sequential connection of the spark plugs P in the secondary circuit of the coil C through the conductors 40 and 41 in the well known manner.

With the switch 33 closed and the motor of the vehicle running, a vacuum is created in the tank V and this vacuum is reflected in the cylinder 19 with the result that my improved switch is operated to the position shown in dotted lines in Figures 1 and 2. In this status of the switch connection between the battery B and the coil C is established by the conductor 32, while connection between the coil C and the sign S is established through conductor 34, one of the terminals 16, contact 25, the other terminal 16, conductor 26, conductor 36, sign S, said current then passing to ground at 30 from the sign and returning to the battery B through ground 31. In this last specified status of my switch it will be obvious that the coil C' is disconnected from the battery by reason of the fact that the contact 23 is out of engagement with the terminals 14 and also disconnected from the sign S by reason of the fact that the contact 24 is out of engagement with the terminals 15. As soon as the motor of the vehicle stops running, the vacuum in the cylinder 19 is destroyed and the spring 27 operates to return the switch to normal position and again connect the coil C' with the sign S and the battery B in the manner heretofore described.

I have described and shown the utility of the switch in connection with the operation of a "neon" sign, but it will be understood that such utility extends to any other electrically operated device that may be substituted for the "neon" sign particularly referred to in the description and shown in the drawings.

I claim:

1. In combination with the motor and the ignition system of a motor vehicle, an electrically operated device, two sources of current for said device one of which is included in said ignition system, and the other located without the system, and means operable in response to the operation of the motor to simultaneously connect the device with the source of current in the system and disconnect the device from the other source and further operable in response to the stopping of the motor to simultaneously disconnect the device from the source of current included in the ignition system and connect the same with the other source of current.

2. In combination with the motor and the ignition system of a motor vehicle, an electrically operated device, a vibratory coil included in said system, a second vibratory coil located without the system, and means operable in response to the operation of the motor to simultaneously connect the device with the coil in the system and disconnect the device from the other coil, and further operable in response to the stopping of the motor to simultaneously disconnect the device from the coil in the ignition system and connect the same with the other coil.

3. In combination with the motor and the ignition system of a motor vehicle, an electrically operated device, two vibratory coils one of which is included in the ignition system and the other located without the system, connections between each coil and the device, a switch device normally closing the connection between the device and the coil without the system while the other connection remains open, and means for operating the switch device in response to the operation of the motor to close the latter connection and simultaneously open the connection between the device and the coil which is without the ignition system.

LOUIS A. KOCH, Jr.